United States Patent [19]

Miralles Bielsa et al.

[11] Patent Number: 6,035,538
[45] Date of Patent: Mar. 14, 2000

[54] READING APPARATUS FOR THE CONTOUR OF SPECTACLE FRAME RIM GROOVES

[75] Inventors: Ferran Miralles Bielsa, Barcelona; Luis Miguel Spadini Martinez, Rubi; Santiago Albert Seseña, Teia, all of Spain

[73] Assignee: Indo Internacional, S.A., Barcelona, Spain

[21] Appl. No.: 09/027,760

[22] Filed: Feb. 23, 1998

[51] Int. Cl.[7] ..................................................... G01B 7/28
[52] U.S. Cl. ............................................................. 33/200
[58] Field of Search .............................. 33/200, 503, 507, 33/557, 560

[56] References Cited

U.S. PATENT DOCUMENTS

| | | | |
|---|---|---|---|
| 4,051,601 | 10/1977 | Godot | 33/200 |
| 4,991,305 | 2/1991 | Saigo et al. | 33/507 |
| 5,097,600 | 3/1992 | Brule et al. | 33/200 |
| 5,121,550 | 6/1992 | Wood et al. | 33/200 |
| 5,615,486 | 4/1997 | Igarashi et al. | 33/200 |

FOREIGN PATENT DOCUMENTS

4107894  9/1991  Germany ................................ 33/200

*Primary Examiner*—G. Bradley Bennett
*Attorney, Agent, or Firm*—Sughrue, Mion, Zinn, Macpeak & Seas, PLLC

[57] ABSTRACT

An apparatus, for reading the groove contour of spectacle frame rims, which includes first and second bearer structures for holding the spectacle frame, a first groove-contour-reading set, a second groove-contour-reading set, and a drive motor. Each of the first and second groove-contour-reading sets includes a first contact member for engaging the groove in one of the spectacle frame rims, a first guide member for guiding the movement of the contact member, and a reading member for reading the movements of the contact means. Further, the apparatus includes a drive motor for simultaneously driving the first and second contact members to thereby simultaneously read the groove contour in the two spectacle frame rims. Because the groove contours are simultaneously read, the apparatus reduces the time necessary to accurately measure the groove contour in each rim of a frame of spectacles.

20 Claims, 10 Drawing Sheets

READING APPARATUS FOR THE CONTOUR OF SPECTACLE FRAME RIM GROOVES

FIELD OF THE INVENTION

The invention relates to an apparatus for reading the groove contour of spectacle frame rims, which comprises: a stand, means for holding said spectacle frames; contact means including feelers for engaging the bottom of said grooves; drive and guide means for the movements of said contact means; and reading means for said movements.

PRIOR ART

As is known, the basic objective of apparatus for reading the groove contour of spectacle frame rims is to follow the bottom of the V-shaped groove of said rims with an appropriate feeler so that one or more pick-ups associated with the said feeler may collect positional geometric data of the successive points of the contour scanned or read and transmit them to a data processing system for storage and subsequent use.

The process of picking up the data relative to the shape and size of the spectacle frame rims, lens or template consists of generating a number of points corresponding to the route followed by the tip of a feeler when running around the complete perimeter of the groove in a spectacle frame rim or external periphery of a lens or template.

The process generically described above is applicable to each of the two rims of each spectacle frame and, therefore, requires to be performed twice to complete a spectacle frame if it is really wanted to adapt each lens precisely to the corresponding rim of the spectacle frame. This means that each spectacle frame requires to be held twice to offer up to the feeler first one rim and then the other for the corresponding reading.

The two rims of a spectacle frame are not exactly the same, nor are the positions thereof relative to the mean vertical nasal axis absolutely symmetrical. The manufacturing tolerances of spectacle frames are sufficiently tight not to cause harm to the wearers, but there are-admissible-differences which recommend, for a good finish and correct assembly of the lenses in the spectacle frames, that independent readings be made for both rims of each spectacle frame.

For many years the frequent practice has been to read only one of the rims and to generate the second rim by symmetry from the reading of the first one. With this method, the reading time was shorter, but the dimensions and shape of the first rim were attributed to the second one, which was not recommendable nor desirable for corrective spectacles, while it was acceptable for sunglasses and protective glasses.

Reading and digitization apparatus have recently been disclosed, which while holding the spectacle frame only once, can read both rims successively. To this end, they are provided with a feeling system which may be moved from one of the rims to the other, without it being necessary to move or relocate the spectacle frame after the initial installation.

French patents Nos. 9102974 and 9105619, EP-A-0 666 139 and U.S. Pat. No. 5 347 762 disclose different solutions for apparatus for the successive reading of both rims of a spectacle frame.

Nevertheless, these known solutions involve more time for reading the contours and less accuracy in certain cases.

SUMMARY OF THE INVENTION

It is an object of this invention to overcome these drawbacks and this object is attained with an apparatus of the type mentioned at the beginning comprising a double set of each of said means, each set being adapted to act with one of the rims, the operation of both sets being simultaneous.

BRIEF DESCRIPTION OF THE DRAWING

Further advantages and features of the invention will be appreciated from the following description in which, without any limiting nature, there is disclosed a preferred embodiment of the invention, with reference to the accompanying drawings, in which.

DETAILED DESCRIPTION OF THE PREFERRED EMBODIMENT

Figure 2:
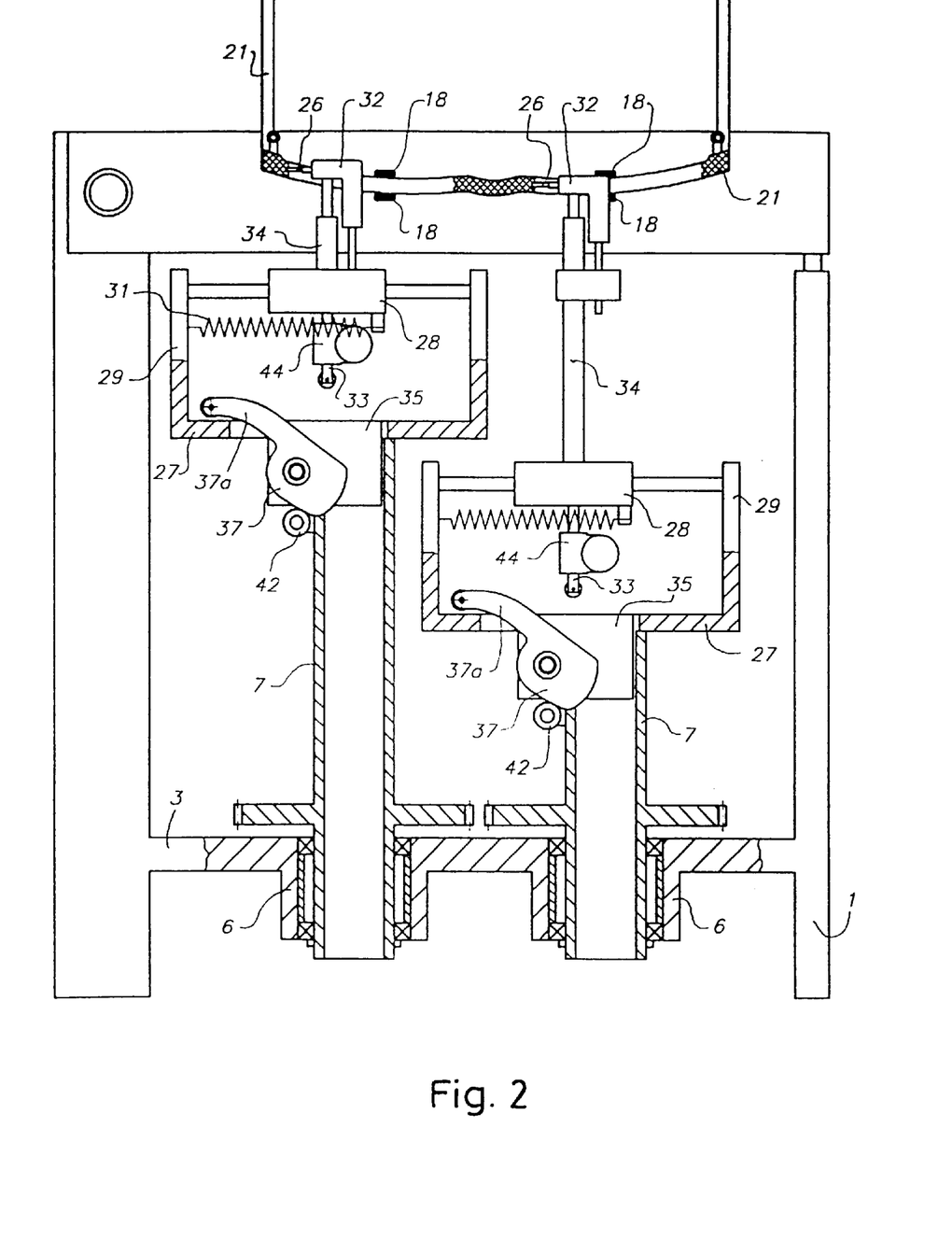
FIG. 2 is a schematic view of the apparatus on an axial plane relative to the two rotary followers, with the platforms positioned transversely.

The apparatus according to the present invention comprises a stand 1, having four vertical legs 2 among which there extends a base 3. Therein there is a seat 4 for a first motor 5 and vertical guideways 6 (FIG. 2) in which rotary followers 7 are seated, capable of rotating about their own axis. The followers 7 are preferably hollow cylinders and close to the base 3 they are provided with gear wheels 8 engaging gears 9 and 10. The first motor 5 drives these gears 9 and 10 and these, in turn, cause the rotary followers to rotate. The invention also contemplates that the motor 5 and the rotary followers 7 may be connected by pulleys and belts.

Figure 9:
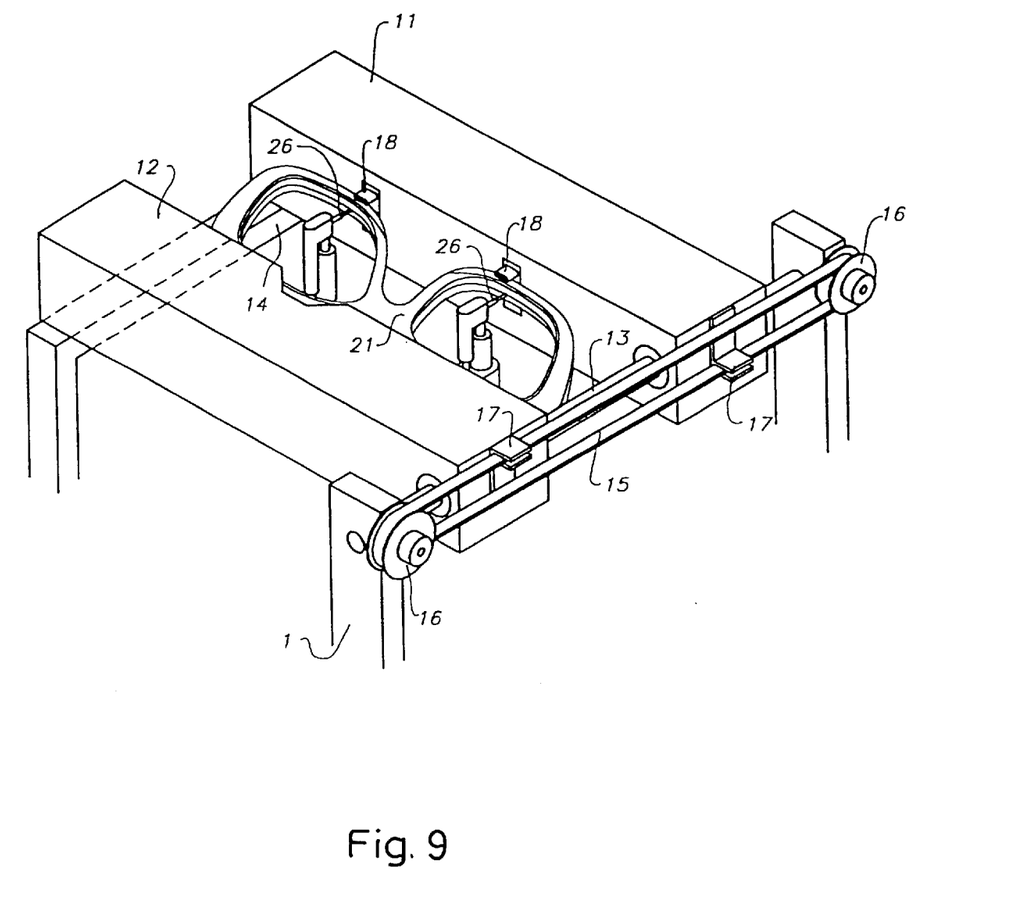
FIG. 9 is a fragmentary perspective view of the bearer structures.

The stand 1 also supports two bearer structures 11 and 12. The latter are guided, at one end region thereof, by a guide bar 13 and at the opposite end region thereof they may slide on a cross member 14 of the stand 1 (FIG. 9), with a translational movement (i.e., a movement in which all the points forming the structure move in the same amount). During this traverse, the structures 11 and 12 slide between a maximum open position and an active (minimum opening) position.

Figure 10:
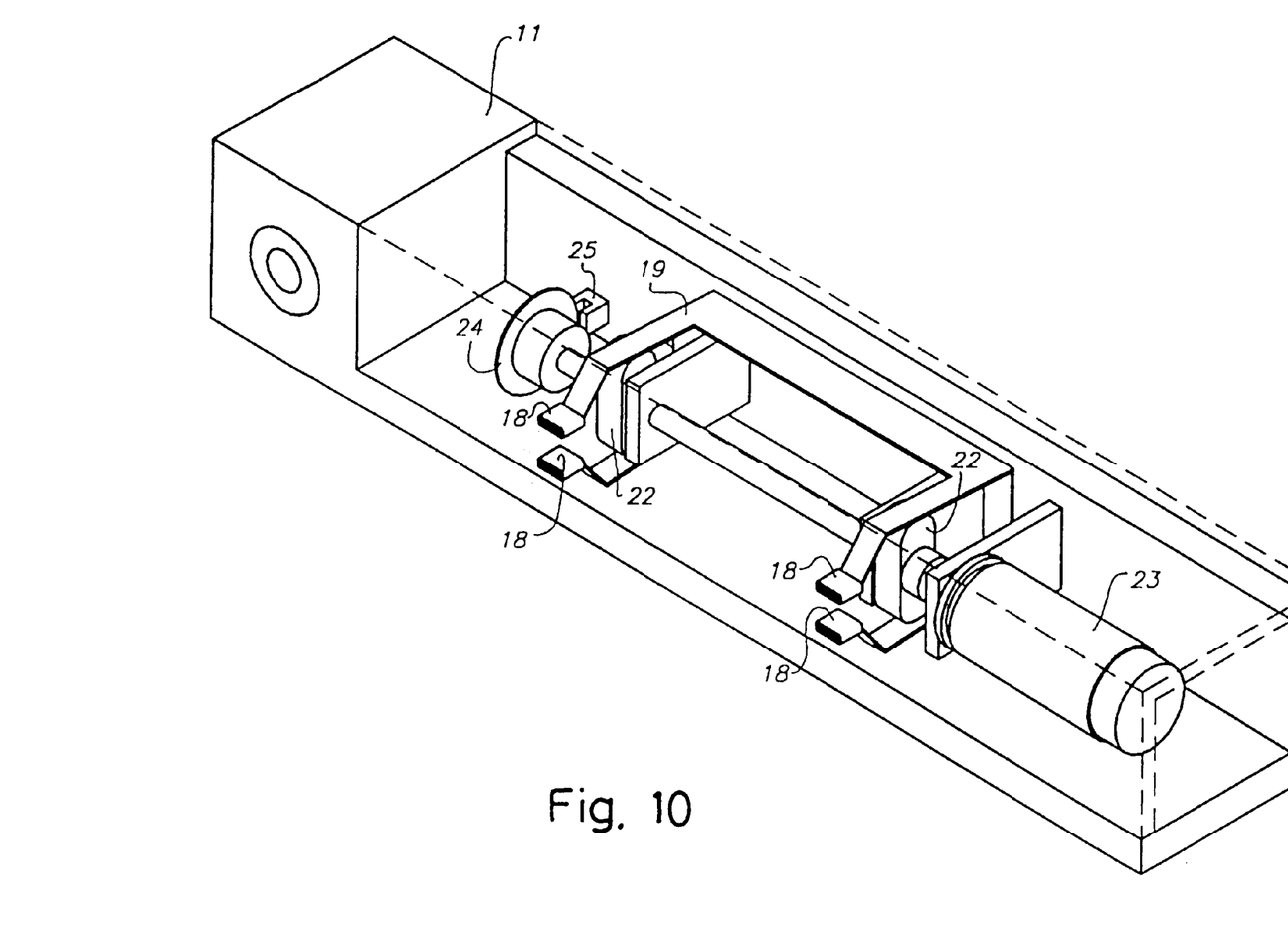
FIG. 10 is a fragmentary schematic perspective view of the spectacle frame holding means.

Both structures 11 and 12 are attached together by a belt 15 mounted around rotatory pulleys 16 and the two runs (upper and lower) of the belt 15 are attached by respective anchor points 17 to the structures 11 and 12. Thus, when the structure 11 moves outwardly, the structure 12 also moves outwardly, mutually increasing the gap between both. The belt 15 is generally moved by hand. At all times, the inner surfaces of the structures 11 and 12 are held parallel and the gripper arms 18 of some resilient gripper means 19 (FIG. 10) extend from these surfaces. In the supporting structure 12, both pairs of gripper arms 18 are symmetrical relative to a notch 20 of the support structure 12.

The purpose of the resilient gripper means 19 is to hold the rims of a spectacle frame 21. The gripper means 19 are preferably integral with the body of the corresponding structure 11, 12 and have arranged under the cantilever gripper arms 18 thereof respective cams 22 which are driven by a first geared motor 23. It is obvious that when the cams 22 are in the position shown in FIG. 10, the gripper arms 18 are spaced apart, whereby the spectacle frame is no longer held. In the position where the cams 22 are rotated in 90° relative to the position shown, they break their engagement with the gripper arms 18 and the latter, in view of their resilience, tend to close together.

A grooved disc 24 and a first optical coupler 25 act as opening/closing limit switches for the gripper means 19 of both structures 11, 12. The floating arrangement of the gripper arms 18 of each gripper means 19 ensures the centered position of the rim groove on the datum line at the preset height R (FIG. 11), coinciding with the median plane of the feelers 26 provided with a spherical tip, to which reference will be made hereinafter.

Figure 1:
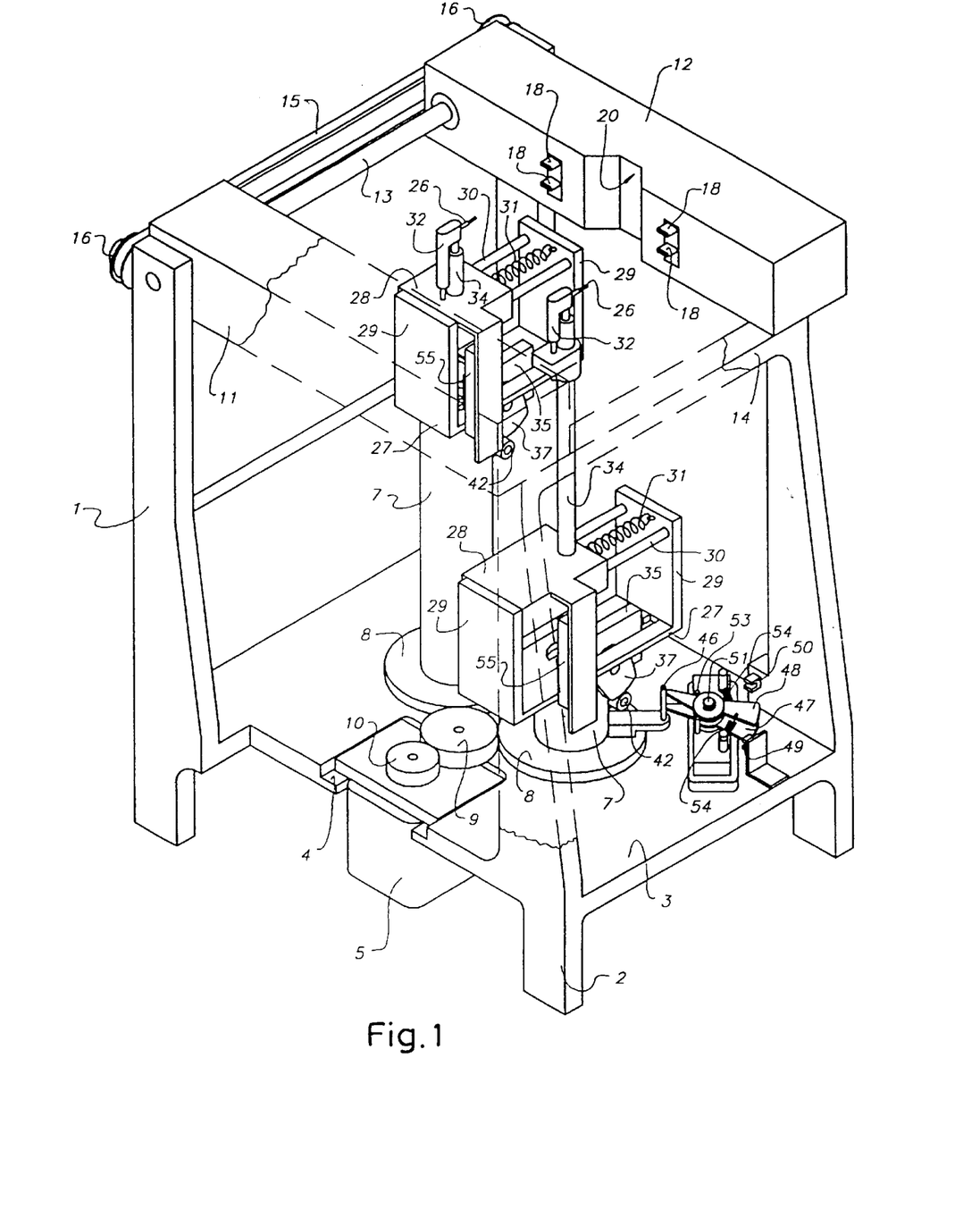
FIG. 1 is a perspective view of the apparatus of the invention, in which, for a better understanding, part of the stand has been shown in phantom line.
Figure 3:
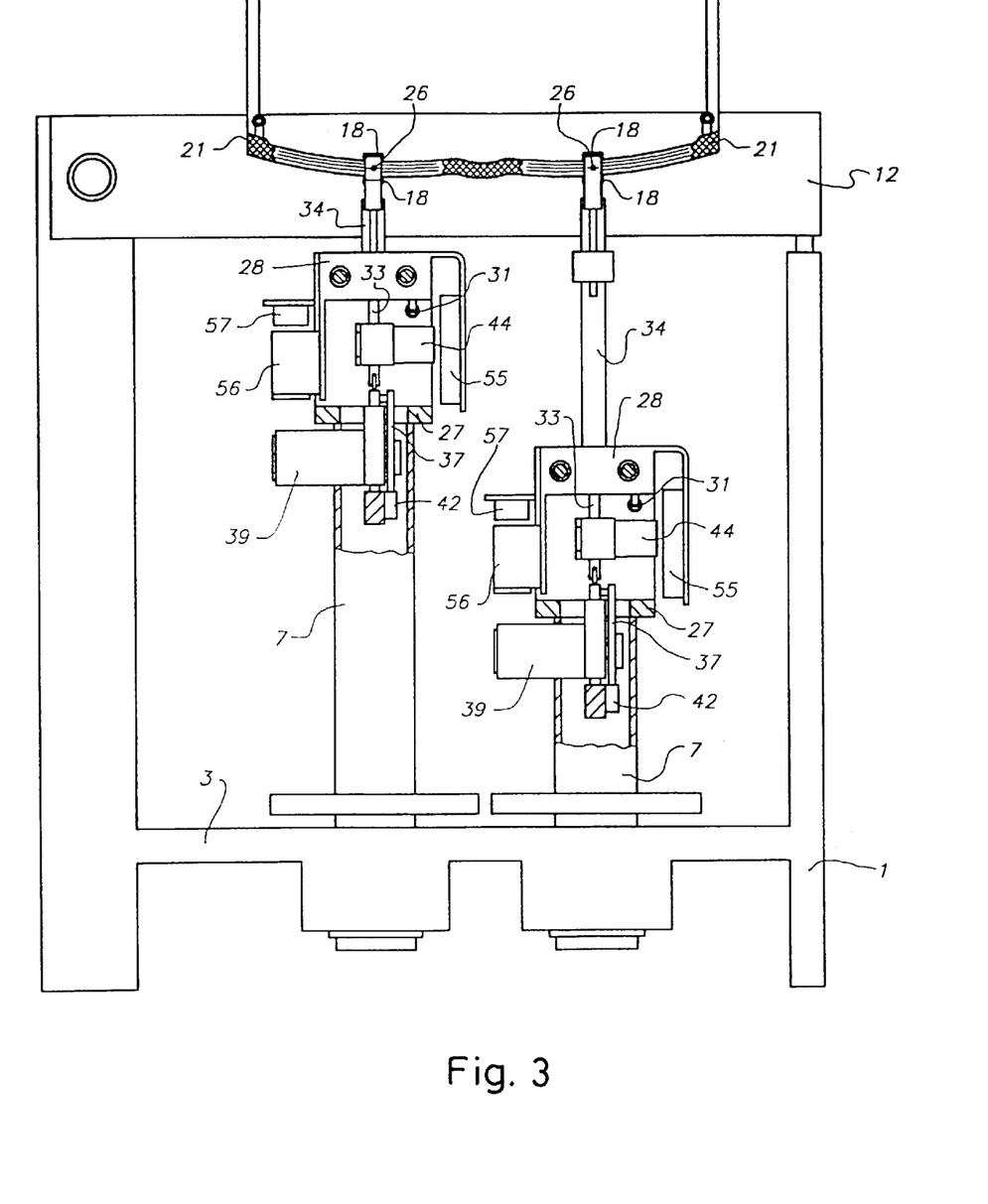
FIG. 3 is a schematic, part sectional view, similar to the previous Figure with the platforms positioned in a longitudinal direction.

At the upper end of each rotatory follower 7 there is a platform 27 and both are integral with the corresponding follower 7 and therefore rotatable therewith. Each platform supports a slider 28 which is movable along the platform 27. This movement takes place between a first active position (FIGS. 2 and 3) wherein the feeler 26 may engage the bottom of the rim groove and a second inactive position opposite to the first position (FIG. 1) in which the feeler 26 is in a position coinciding with the vertical axis of rotation of the rotary follower 7.

For moving the slider 28, each platform 27 is preferably provided with two opposite end flaps 29, to which parallel bars 30 passing through the slider 28 are attached, thereby facilitating the movement thereof. For reasons of sizing, both platforms 27 are located at different heights, to avoid mutual interference during rotation.

Each slider 28 is attached to one end of a first spring 31 and the other end thereof is attached to one of the flaps 29, whereby the first springs 31 urge the corresponding slider to the first, active position thereof.

The purpose of the feelers 26 is to follow the bottom of the grooves of the rims of the spectacle frame 21 and they extend from a head member 32 of a corresponding vertical stem 33 and there is preferably disposed parallel to the stem 33 a rotation-inhibiting rod 60 (FIG. 4) to which the head member 32 of the feeler is fixedly attached, which head when constrained laterally by a groove in the slider 28, maintains its orientation in the direction of the vertical plane.

Each of the stems 33 passes through (with a clearance) one of the sliders 28 and, consequently, has a lower portion 33a (FIG. 11) which is below the slider 28 and an upper portion 33b which extends above the slider 28. Therefore, it accompanies the slider 28 in the movements (horizontal and rotatory) thereof and furthermore may have a vertical movement, obviously independent of the slider 28. Reference will be made hereinafter again to this vertical movement.

The said upper portion 33b is provided with the head member 32 and is also preferably sleeved in part loosely with a guide member 34. The lower portion 33a is associated with an elevating member 35 and the end thereof is preferably provided with a first small idler wheel 36 (FIGS. 4 and 5) to facilitate the movement thereof along the upper surface of the elevating member 35, all as referred to hereinafter.

The apparatus also comprises a swivel lever 37 having the peculiarities described hereinafter.

The swivel lever 37 may pivot about a first shaft 38 (FIG. 5) which is also the shaft of a second geared motor 39 capable of causing the swivel lever 37 to rotate. This shaft also passes through the elevating member 35, whereby the swivel lever 37, second geared motor 39 and elevating member 35 are fixedly attached in a vertical movement.

Figure 4:
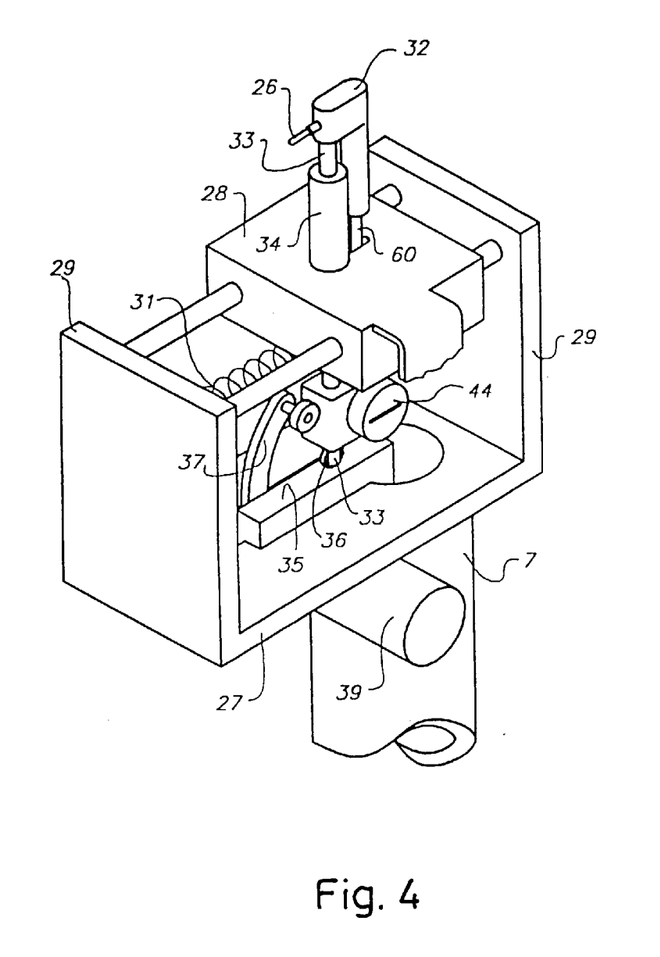
FIG. 4 is a perspective view of the platform and of certain items adjacent thereto.
Figure 11:
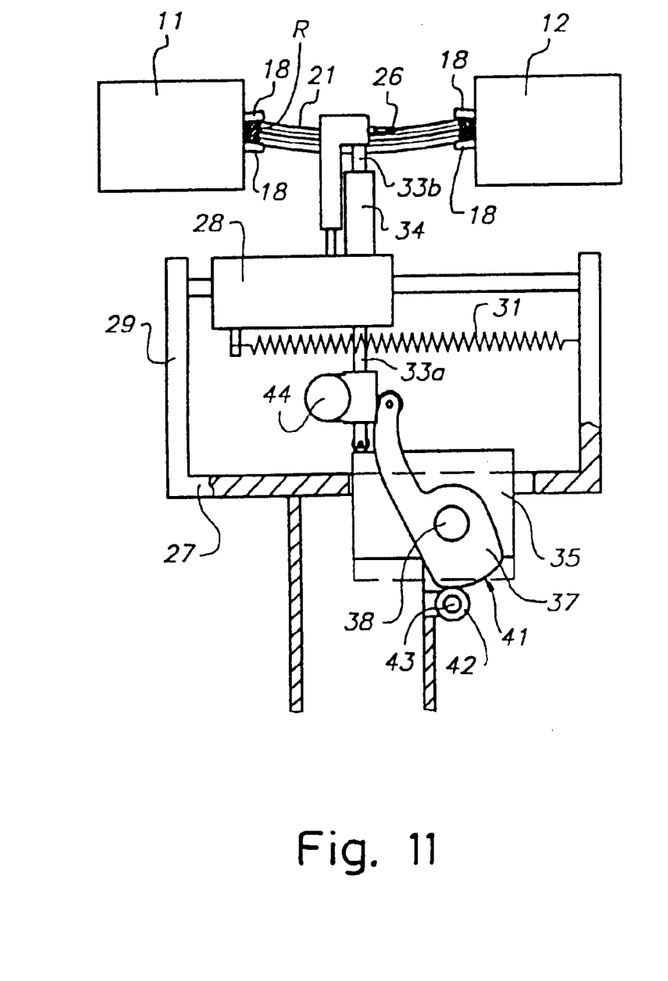
FIG. 11 is an elevation view of a platform, opposite to that of FIG. 2, with the vertical stem supported in the elevator.

The swivel lever 37 has a first swivel lever arm 37a the free end of which is associated with a second small idler wheel 40 (FIG. 5) and, through the small wheel 40, it may push a first emitter 44 (to which reference will be made hereinafter) which is fixedly attached to the vertical stem 33 (FIGS. 4 and 11). Thus, when the swivel lever 37 is driven by the second geared motor 39 it moves the vertical stem 33 and the slider 28 itself towards the said second position opposite to the active position, against the urging of the first spring 31.

Figure 5:
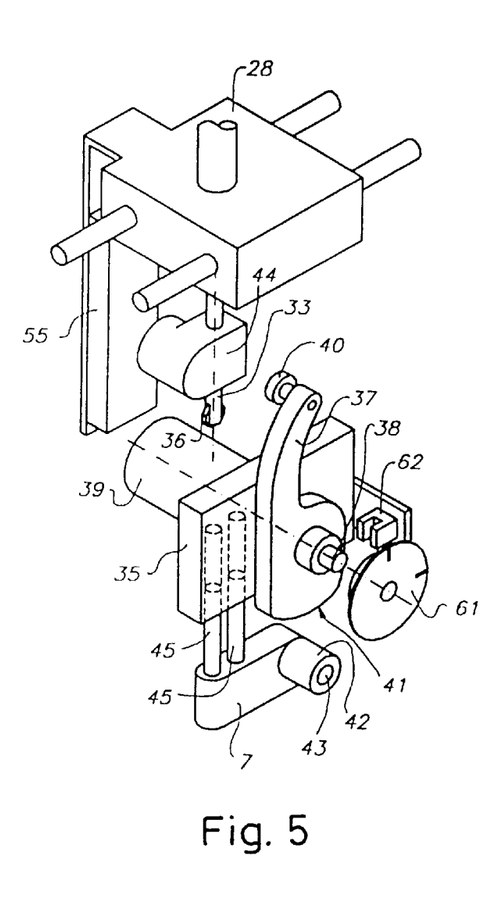
FIG. 5 is an exploded view of certain items associated with the platform, without the platform, in a perspective view opposite to that of the previous Figure.
Figure 12:
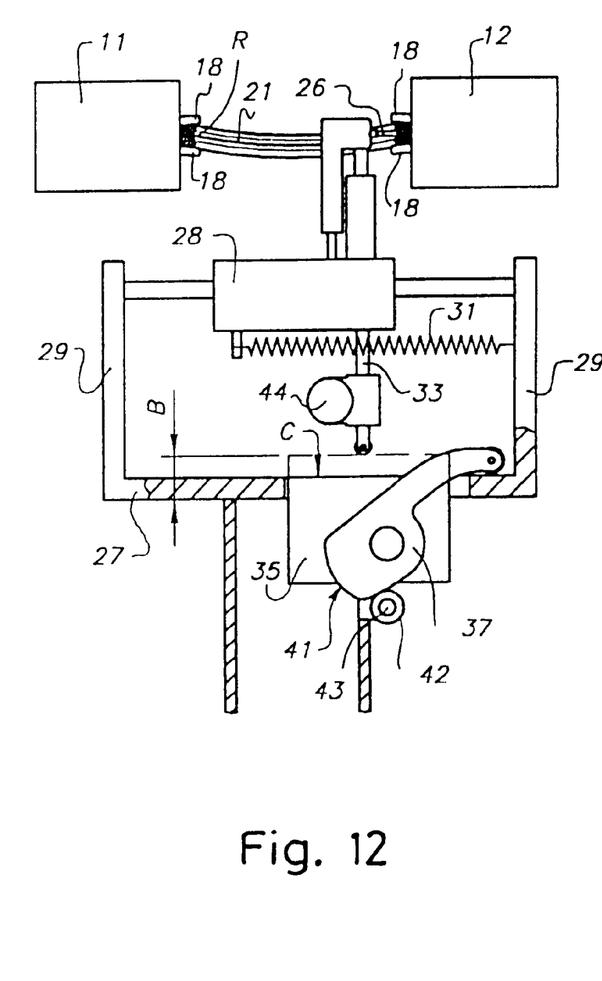
FIG. 12 is a similar view to the previous one, with the stem separated from the elevator.

The swivel lever 37, opposite to the said first swivel lever arm 37a, is provided with a cam surface 41 (FIGS. 5, 11 and 12). The cam surface 41 is associated with a roller 42 which may rotate about a second horizontal shaft 43 of constant height and mounted on the rotatory follower 7 (shown schematically in FIG. 5).

When the cam surface 41 engages the roller 42 at an area removed from the first shaft 38 (FIG. 11), the unit formed by the swivel lever 37, the geared motor 39 and the elevating member 35 is held at a certain level. On the contrary, when the area of the cam surface 41 engaging the roller 42 is closer to the first shaft 38 (FIG. 12), the said unit descends to a lower level.

There is contemplated the provision of guideways 45 (FIG. 4), fixedly attached to the follower 7 and insertable in corresponding cavities of the elevating member 35, for the up and down movements allowing the said changes of level.

When the elevating member is at its upper level (FIG. 11), the vertical stem 33 bears on the elevating member 35 and, therefore, is restrained from a vertical downward movement. Obviously, in this case, the feeler 26 is also restrained. When the elevating member 35 has gone down (FIG. 12), the vertical stem 33 and the feeler 26 are free to move vertically and the feeler may follow any variations in the height of the bottom of the rim groove. A limit disc 61 and a second optical coupler 62 govern the rotation of the geared motor 39.

Figure 8:
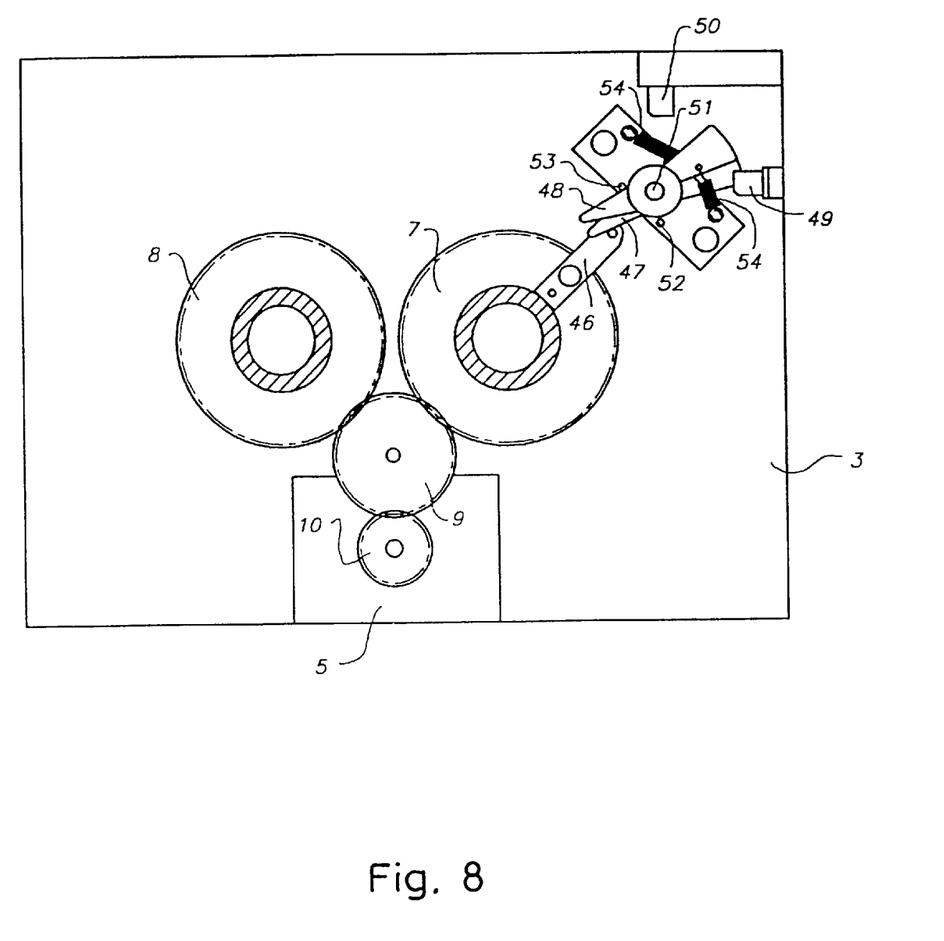
FIG. 8 is a schematic view plan view from above of the limit device, in which the rotary followers are shown in section on a horizontal plane.

One of the gear wheels 8 fixedly attached to a rotary follower 7 is preferably provided with a second follower arm 46 (FIGS. 1 and 8) and which in the anticlockwise rotation thereof drives a first limit switch lever 47, associated with a first limit switch 49 and in the clockwise rotation thereof drives a second limit switch lever 48, associated with a second limit switch 50.

The first and second limit switch levers 47 and 48 pivot on a common shaft 51 and are held symmetrically in engagement with stop members 52 and 53 by second springs 54, out of the range of action of the first and second limit switches 49 and 50. On each complete rotation of the followers 7, the second gear arm 46 causes the pivoting of one of the first and second limit switch levers 47 and 48 so that the opposite end thereof activates one of the first and second limit switches 49 or 50, stopping the motor 16.

Should one of the limit switches fail, the stop member 52 or 53 blocks the rotation, activates the corresponding system alarm and this cuts the power supply to the motor.

For reading the movements of the feelers 26, the apparatus is provided with the items described below, some of which have already been mentioned. Each of the vertical stems 33 is fixedly attached to a first light source 44 (FIGS. 2, 3, 5 and 7) and, therefore, this light source 44 follows the vertical movements of the feeler 26 when it travels around the bottom of the groove of one of the rims. Facing this first light source 44 there is a first linear transducer 55 which is fixedly attached to the respective slider 28 and, therefore, does not follow the vertical movement of the feeler 26 and, thus, is useful for measuring the vertical movements of the feeler 26.

Figure 6:
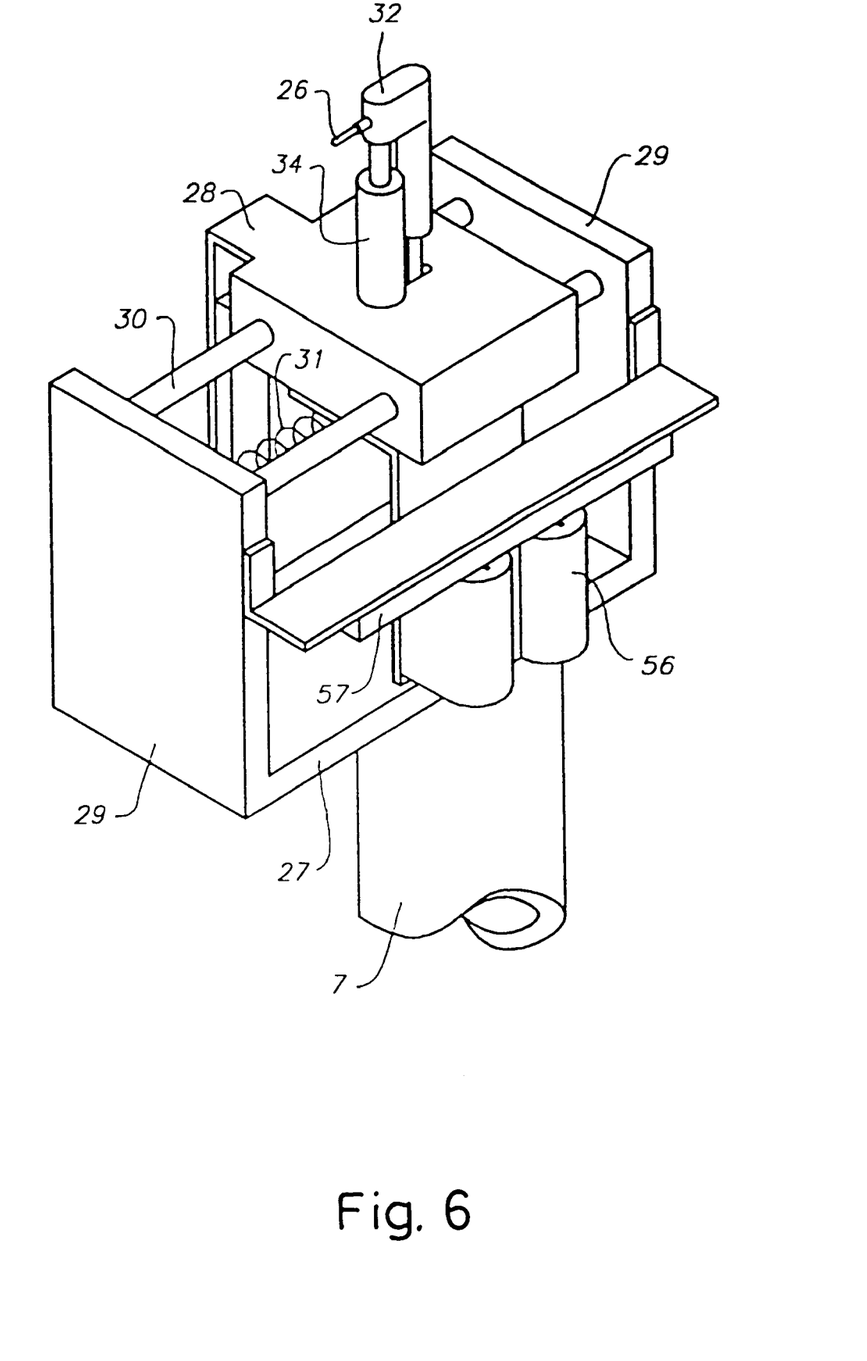
FIG. 6 is a perspective view opposite to that of FIG. 4.
Figure 7:
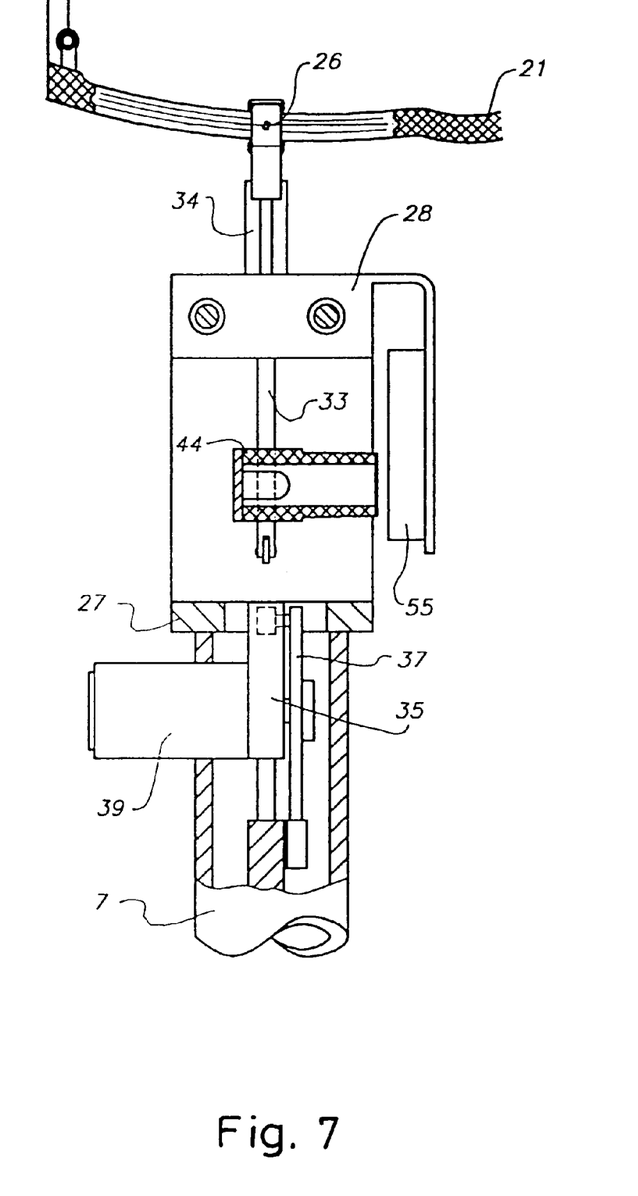
FIG. 7 is an elevation view of a portion of a rotary follower, the platform, items associated therewith, the feeler and a spectacle frame rim.

For the measurement of the radial movements of the feelers 26, for each rim there is provided a second light source 56 fixedly attached to the corresponding slider 28. As a result of such attachment, each second source 56 follows the radial movements of the feeler 26. Facing the second source 56, attached to a U-shaped fork, there is a second transducer 57 (FIGS. 3 and 6) fixedly attached to the platform 27 and, therefore, to the rotary follower 7. Since the transducer 57 is not radially moveable, the light source 56 sweeps the sensitive receiving area of the transducer 57 and the radial movements of the feeler 26 as it runs around the perimeter are picked up by the second transducer 57 and processed for subsequent use.

The angle through which the feelers rotate is obtained directly, since the rotary drive motor 5 is of the "stepper" type. On the basis of a reference obtained from the second and first optical couplers 62 and 25, the system feeds forward by motor steps, such that each step or groups of steps represents a portion of the angle swept. The radius and vertical movement measurements are taken for each portion and are recorded on a table.

The electrical conductors for the transducers, light sources, motors and limit switches are preferably of the extraflexible type, with PVC or silicone sheathing, also extraflexible. They have not been shown, to facilitate an understanding of the drawing figures. Entanglement thereof is avoided by feeding them through the hollow interior of the columns of the rotary followers 7 down to the apparatus base.

Reference is made hereinafter to the operation of the apparatus, although previously certain details thereof have already been mentioned.

After the bearer structures 11 and 12 have been brought together, a spectacle frame 21 is placed between the ends of the gripper arms 18 of the resilient gripper means 19 located between these structures. The gripper means 19 are closed to hold the spectacle frame 21 and locate it at the datum level, which is the height of the horizontal plane where the centers of the feelers 26 of both rims are to be found. The sliders 28, together with the corresponding feelers 26, are in the second inactive position thereof (in the center of rotation), opposite to the first active position, of contact of the feelers with the rim grooves (FIG. 11).

After the spectacle frame 21 is held, the swivel levers 37 are caused to rotate by the second geared motors 39 and release the sliders 28, allowing them, as urged by the first springs 31, to move from the previous position until the feelers contact the bottom of the spectacle frame 21 rim groove. This feed of the feelers 26 towards the spectacle frame takes place maintaining a preset height thanks to the elevator 35, which is at its uppermost level.

When the feelers 26 have reached the corresponding groove, the swivel levers 37 continue to rotate until they reach the end of the stroke thereof (FIG. 12), causing close to the end thereof the lowering of the elevator 35, to allow the feeler 26 to have free vertical movement in both directions in order to follow the path of the spectacle frame 21 groove.

When both feelers 26 have reached the bottom of the rim grooves, the motor 5 causes the simultaneous synchronized rotation of the rotary followers 7 and, therewith, of the sliders 28 and their corresponding feelers 26 until they have traversed all the bottom of the groove. On completion of the rotation, the second follower arm 46 impinges on one of the first and second limit switch levers 47 or 48 and the apparatus is stopped.

The polar co-ordinates of each point of the plane projection of the perimetric contour of the rim being read are obtained from the synchronized rotation of the followers 7 driven by the stepper motor 5 through the gears 9 and 10 and the radial movement of corresponding linear transducers 57 attached to the followers 7.

As already mentioned above, the evolution of the curvature of the spectacle frame on a vertical axis is obtained by way of the first emitter 44 and the first linear transducer 55.

What we claim is:

1. An apparatus for reading the groove contour of spectacle frame rims, comprising:
   a stands;
   means for holding said spectacle frames;
   a first groove-contour-reading set comprising:
      first contact means for engaging grooves in one of the spectacle frame rims;
      first guide means for guiding the movements of said first contact means; and
      first reading means for reading said movements of said first contact means,
   a second groove-contour-reading set comprising:
      second contact means for engaging grooves in a second one of the spectacle frame rims;
      second guide means for guiding the movements of said second contact means;
      second reading means for reading said movements of said second contact means; and
   drive means for simultaneously driving said first and second contact means to thereby simultaneously read the groove contour in two spectacle frame rims.

2. The apparatus of claim 1, wherein said holding means comprises two bearer structures which are moveable, with movements of translation, between a fully open position and an active position; a resilient gripper means situated on each of said structures, each of said gripper means being provided with two pairs of gripper arms tending to close to hold both rims; a rotary cam for each pair of gripper arms, adapted to cause the opening of the gripper arms; a first geared motor for the rotation of said cams; and regulating means for said first geared motor.

3. The apparatus of claim 1, wherein each of said first and second contact means comprises a feeler, the movements of each feeler being simultaneous.

4. The apparatus of claim 1, wherein said drive means comprises a first motor and means for the transmission of the movement of said first motor and each set further comprises: a vertical follower mounted on said stand and rotatable about its own axis; a horizontal platform mounted on said vertical follower and rotatable therewith; a slider moveable along said platform between a first active position and a second position opposite thereto; a first spring urging said slider to said first position; a swivel lever capable of rocking and having a first swivel lever arm adapted to move and hold said slider in said second removed position, overcoming said first spring; an elevator vertically moveable with the rocking of said swivel lever, between a raised position and a lowered position; a second geared motor for moving said swivel lever; and a vertical stem passing through said slider and being integral with the horizontal and rotary movements thereof, said stem having a portion below said slider and an upper portion which extends from said slider, said lower portion resting on said elevator in the elevated position thereof and being free for small vertical movements in the lowered position thereof, and the upper portion having a head from which said feeler emerges.

5. The apparatus of claim 4, wherein said platforms of said sets are at different heights.

6. The apparatus of claim 4, wherein each set further comprises a roller: provided with a second horizontal shaft; adapted to rotate around said second shaft; and mounted on a rotatable follower; and wherein said swivel lever is rotatable around a first horizontal shaft, which is vertically moveable and the swivel lever opposite to said first swivel lever arm, has a cam surface which bears on said roller, such that a rotation of said swivel lever causes a vertical movement of said first shaft and, consequently, of the swivel lever itself.

7. The apparatus of claim 6, wherein, in each set, said second geared motor is coaxial, by means of said first shaft, with said swivel lever, which crosses through said elevator, with which it shares vertical movements.

8. The apparatus of claim 4, wherein, in each set, said upper portion of said vertical stem is partially and loosely surrounded by a guide member fixedly attached to said slider.

9. The apparatus of claim 4, wherein, in each set, said lower portion of said vertical stem is terminated with a first small idler wheel.

10. The apparatus of claim 4, wherein, in each set, said swivel lever is provided on the first swivel lever arm thereof with a second small idler wheel.

11. The apparatus of claim 4, wherein one of said rotatable followers is fixedly attached to a second laterally extending follower arm which, in the rotation thereof, is adapted to make contact with at least one limit switch lever and move it to activate a limit device stopping said first motor.

12. The apparatus of claim 4, wherein each of said first and second movement reading means comprises: a first emitter fixedly attached to said lower portion of said vertical stem; a first linear transducer fixedly attached to said slider and permanently facing said first emitter; a second emitter fixedly attached to said slider; and a second linear transducer fixedly attached to said follower and permanently facing said second emitter.

13. An apparatus for reading the groove contour of spectacle frame rims, comprising:
  a stand;
  a first rotary follower mounted to said stand and rotatable about a first axis, a first feeler mounted to said first rotary follower, wherein said first feeler is configured to engage one of the grooves in the spectacle frame, and a first measurement device configured so as to track the movement of said first feeler;
  a second rotary follower mounted to said stand and rotatable about a second axis which is parallel to said first axis, a second feeler mounted to said second rotary follower, wherein said second feeler is configured to engage a second one of the grooves in the spectacle frame, and a second measurement device configured so as to track the movement of said second feeler;
  a drive motor mounted to said stand, wherein said drive motor is coupled to said first rotary follower and to said second rotary follower so that said drive motor simultaneously rotates said first and second rotary followers.

14. The apparatus of claim 13, further comprising a first bearer structure and a second bearer structure mounted on said stand, wherein each of said first bearer structure and said second bearer structure includes at least one pair of gripper arms thereon to hold the spectacle frames.

15. The apparatus of claim 14, wherein each of said pairs of gripper arms is resiliently biased to a closed position, said apparatus further comprising a rotary cam connected to each of said pairs of gripper arms so as to cause the gripper arms to open, and wherein said first bearer structure and said second bearer structure are moveable relative to one another between a fully open position and an active position.

16. The apparatus of claim 13, further comprising:
  a first horizontal platform mounted on said first rotary follower and rotatable therewith, a first slider moveable along with said first platform between a first active position and a second position opposite thereto, said first slider being biased to said first active position, a first swivel lever capable or rotation and having a first swivel lever arm adapted to move and hold said first slider in its second position, a first elevator vertically movable, with the rotation of said first swivel lever, between a raised position and a lowered position, a first geared motor for moving said first swivel lever, and a first vertical stem passing through said first slider and being integral with the horizontal and rotary movements of said first slider, said first vertical stem having a first lower portion below said first slider and an upper portion which extends above said first slider, said first lower portion resting on said first elevator in the elevated position thereof and being free for vertical movements in the lowered position thereof, and the upper portion of said first vertical stem having a first head from which said first feeler extends;
  a second horizontal platform mounted on said second rotary follower and rotatable therewith, a second slider moveable along with said second platform between a first active position and a second position opposite thereto, said second slider being biased to its first active position, a second swivel lever capable or rotation and having a second swivel lever arm adapted to move and hold said second slider in its second position, a second elevator vertically movable, with the rotation of said second swivel lever, between a raised position and a lowered position, a second geared motor for moving said second swivel lever, and a second vertical stem passing through said second slider and being integral with the horizontal and rotary movements of said second slider, said second vertical stem having a second lower portion below said second slider and a second upper portion which extends above said second slider, said second lower portion resting on said second elevator in the elevated position thereof and being free for vertical movements in the lowered position thereof, and the upper portion of said second vertical stem having a second head from which said second feeler extends.

17. The apparatus of claim 16, wherein said first platform and said second platform are mounted at different heights with respect to said stand.

18. The apparatus of claim 16, further comprising:
a third horizontal shaft connected to said first rotary follower, a first roller rotatably mounted on said third horizontal shaft,
wherein said first swivel lever is rotatable around a first horizontal shaft which is vertically movable and the first swivel lever opposite to the first swivel lever arm has a first cam surface which bears on said first roller such that a rotation of said first swivel lever causes a vertical movement of said first shaft and, consequently of the first swivel lever itself; and
a fourth horizontal shaft connected to said second rotary follower, a second roller rotatably mounted on said fourth horizontal shaft,
wherein said second swivel lever is rotatable around a second horizontal shaft which is vertically movable and the second swivel lever opposite to the second swivel lever arm has a second cam surface which bears on said second roller such that a rotation of said second swivel lever causes a vertical movement of said second shaft and, consequently of the second swivel lever arm itself.

19. The apparatus of claim 16, wherein said first geared motor is connected to said first swivel lever by said first shaft, and wherein said first shaft crosses through said first elevator so as to share vertical movements with said first elevator, and
wherein said second geared motor is connected to said second swivel lever by said second shaft, and wherein said second shaft crosses through said second elevator so as to share vertical movements with said second elevator.

20. The apparatus of claim 16, wherein said first measurement device includes a first emitter fixedly attached to said lower portion of said first vertical stem, and a first linear transducer fixedly attached to said first slider and facing said first emitter, a third emitter fixedly attached to said first slider, and a third linear transducer fixedly attached to the first rotary follower and facing said third emitter, and
wherein said second measurement device includes a second emitter fixedly attached to said lower portion of said second vertical stem, and a second linear transducer fixedly attached to said second slider and facing said second emitter, a fourth emitter fixedly attached to said second slider, and a fourth linear transducer fixedly attached to the second rotary follower and facing said fourth emitter.

* * * * *